Figure 1:
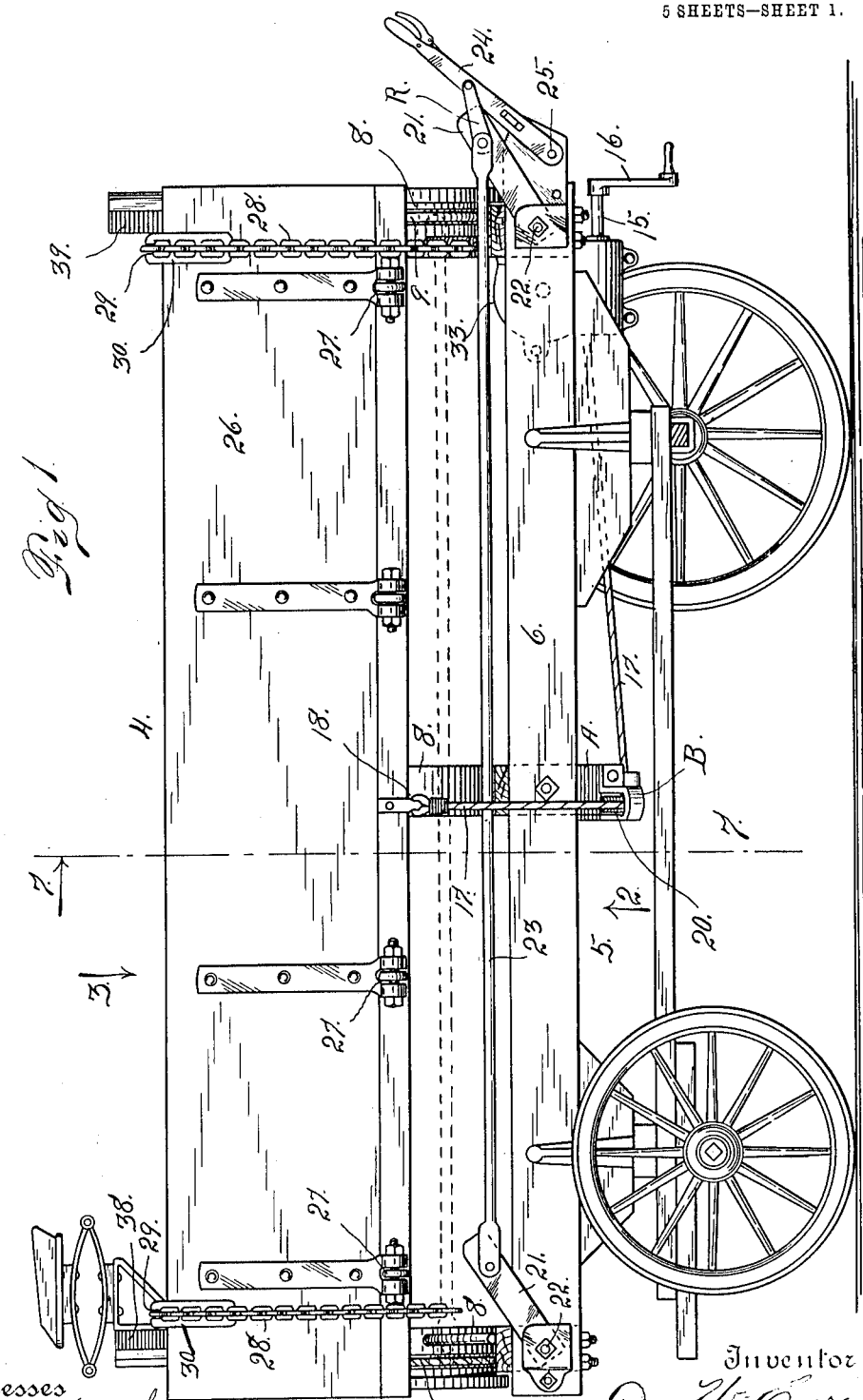

D. W. CARR.
DUMPING BODY FOR VEHICLES.
APPLICATION FILED JAN. 4, 1909.

949,314.

Patented Feb. 15, 1910.
5 SHEETS—SHEET 4.

Witnesses
Otto E. Hoddick
J. D. Thornburgh

Inventor
Dox W. Carr.
By
Attorney

D. W. CARR.
DUMPING BODY FOR VEHICLES.
APPLICATION FILED JAN. 4, 1909.

949,314.

Patented Feb. 15, 1910.

5 SHEETS—SHEET 5.

Witnesses
Otto E. Hoddick
J. D. Thornburgh

Inventor
Dox W. Carr.
By
Attorney

UNITED STATES PATENT OFFICE.

DOX W. CARR, OF GREELEY, COLORADO, ASSIGNOR TO THE GREELEY MANUFACTURING COMPANY, OF GREELEY, COLORADO, A CORPORATION.

DUMPING-BODY FOR VEHICLES.

949,314.  Specification of Letters Patent.  Patented Feb. 15, 1910.

Application filed January 4, 1909. Serial No. 470,686.

*To all whom it may concern:*

Be it known that I, Dox W. CARR, a citizen of the United States, residing at Greeley, county of Weld, and State of Colorado, have invented certain new and useful Improvements in Dumping-Bodies for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in dumping bodies for vehicles, my object being to provide a device of this class in which the dumping box or body is mounted to rock upon a frame, the frame and the body being connected by cables or other flexible devices which operate in harmony with the rocking movement, as the body is tilted laterally in either direction.

For the purpose of actuating the dumping body, I provide the stationary framework of the vehicle with a centrally located longitudinally disposed shaft which is exposed at one extremity of the vehicle, and provided with a crank for operating purposes. This shaft is provided with a worm which engages a worm wheel mounted upon a transversely arranged shaft having cone-shaped drums which increase in diameter outwardly from their inner extremities. Two cables are respectively connected with these drums at one extremity, while their opposite extremities are connected with the opposite sides of the dumping body at centrally located points. Interposed between the drums and the points for the attachment of the cables, are guide pulleys. By virtue of the conicity of the drums and the arrangement of the cables thereon, both cables are held taut during the tilting of the body to the dumping position in either direction. In other words, the cable which is connected with the side of the body which moves upwardly during the tilting operation, winds from the smallest diameter of the pulley to the largest, since the arc in which the rising side of the body is traveling is continually increasing; while the cable connected with the opposite side winds from the largest diameter of the pulley toward its smallest diameter, since the arc in which the downwardly moving side of the body is traveling is continually diminishing.

Having briefly outlined my improved construction, I will proceed to describe the same in detail, reference being made to the accompanying drawing in which is illustrated an embodiment thereof.

Figure 2:
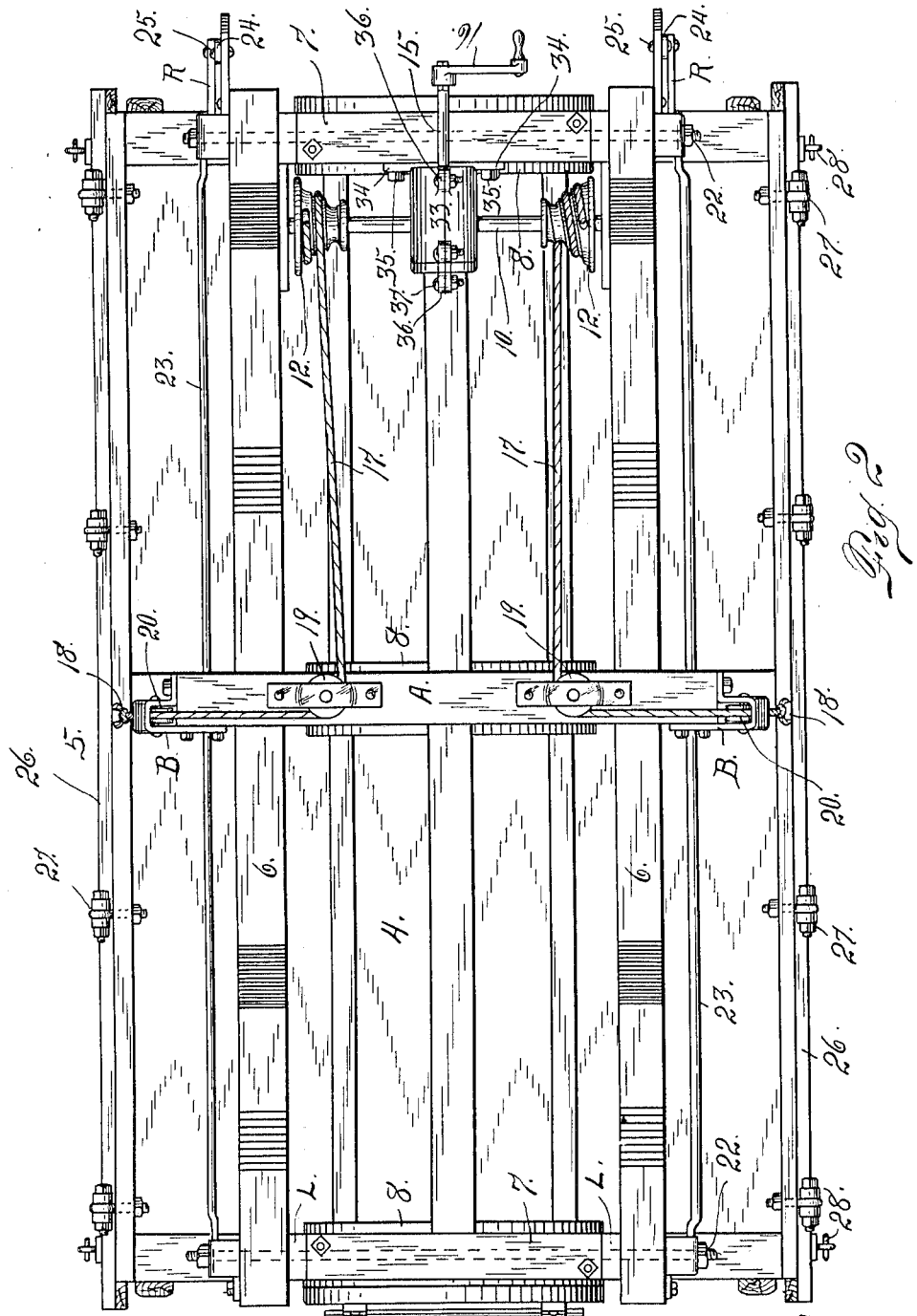
Figure 3:
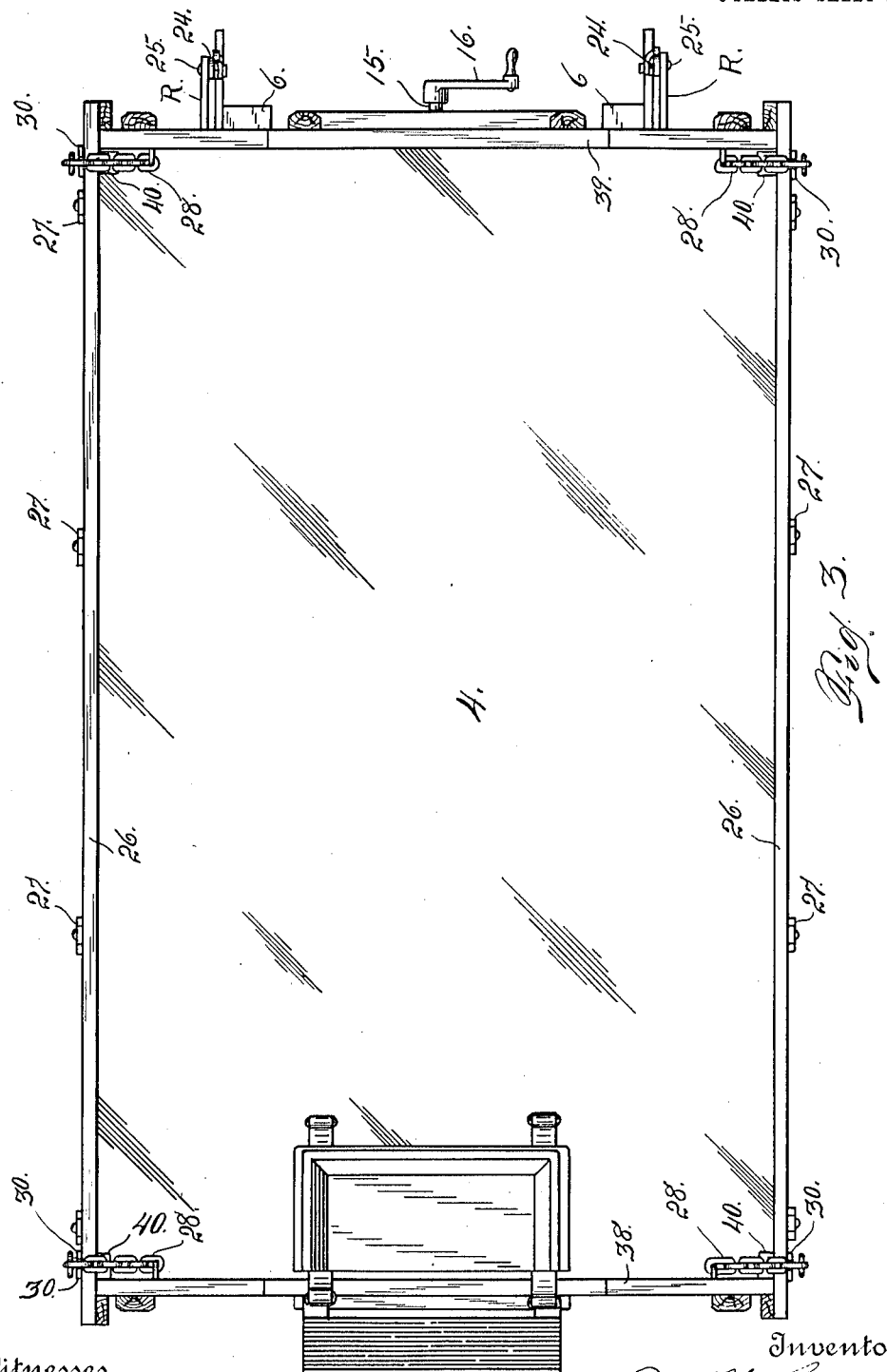
Figure 4:
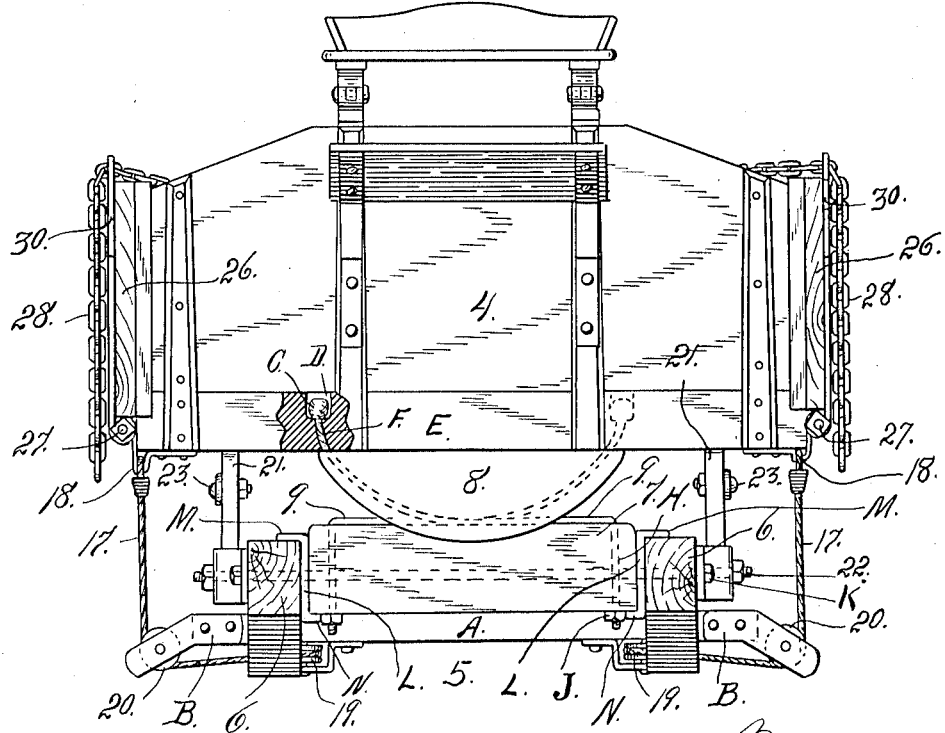
Figure 5:
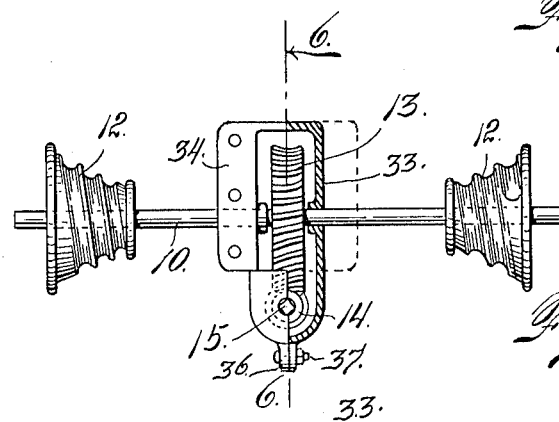
Figure 6:
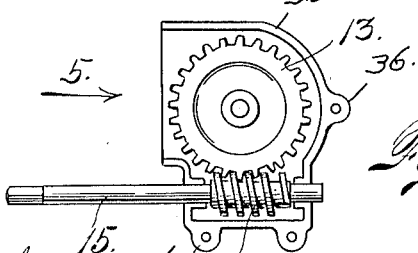
Figure 7:
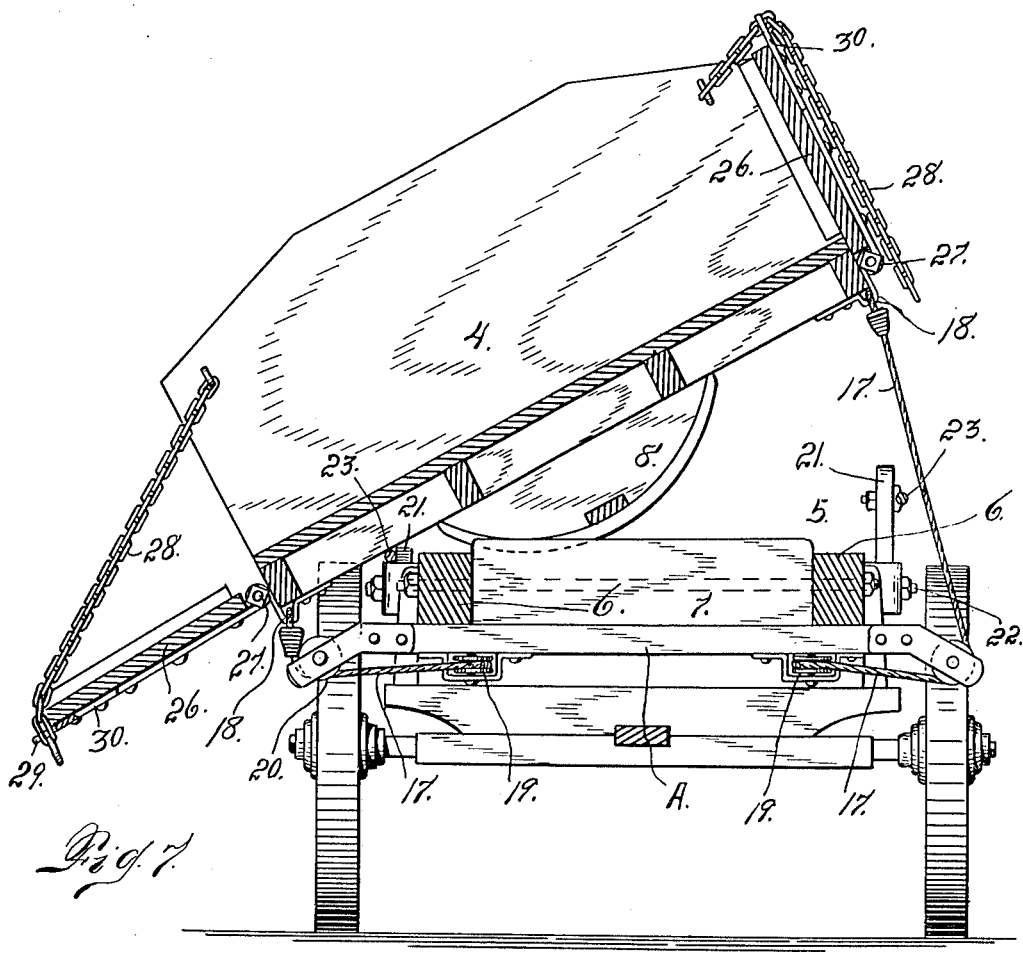
Figure 8:
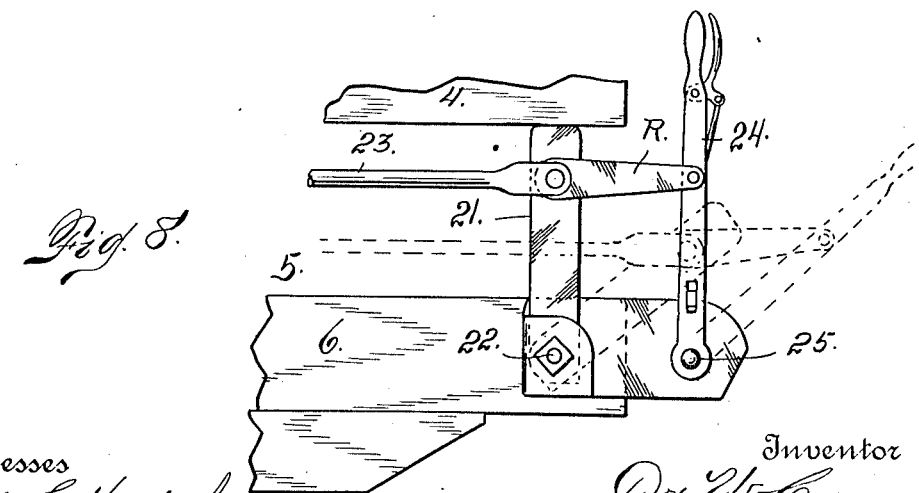

In this drawing, Figure 1 is a side elevation of a vehicle equipped with my improvements. Fig. 2 is an underneath view of the dumping body and the framework with which it is connected. It may otherwise be termed a bottom plan view of the same. Fig. 3 is a top plan view of the dumping body provided with my improvements. Fig. 4 is a front end elevation of the dumping body and the framework upon which it is mounted, showing the same detached from the vehicle. Fig. 5 is a detail view of the drum shaft with the worm wheel thereon, the worm for operating the shaft being also illustrated. This may be termed a view looking in the direction of the arrow 5 Fig. 6. Fig. 6 is a section taken on the line 6—6 Fig. 5, the worm wheel, the worm shaft and worm being shown in elevation. Fig. 7 is a vertical section taken on the line 7—7 Fig. 1. Fig. 8 is a fragmentary detail view illustrating the means for operating the dumping bed supports, which are arranged on opposite sides thereof.

The same reference characters indicate the same parts in all the views.

Let the numeral 5 designate the stationary framework of the vehicle body which is provided with longitudinal side beams 6 and transverse bottom beams 7, which project slightly above the side beams and form a support for rockers 8 mounted upon the bottom of the dumping body 4. These rockers with the exception of the center one are connected with the framework by cables 9. One extremity of each cable is connected with the frame work at one side, while its opposite extremity is connected with the remote extremity of the rocker. By virtue of this arrangement, the body is free to tilt transversely in either direction.

The preferred manner of attaching the cables to the dumping body of the framework upon which it is mounted, is illustrated in Fig. 4. Each cable is provided at one extremity with a stop or enlargement C adapted to engage a recess D formed in the upper side of the front and rear cross beams E of the dumping body. Below the recess D an opening F is formed extending through the beam. The cable 9 is threaded through this opening F until its enlarged extremity C enters the socket D and forms a stop to the further movement of the cable. The latter is then passed underneath the rocker 8 in operative engagement with the same, and finally passed downward through a vertical opening H formed in one extremity of the bottom beam 7. The cable protrudes beyond the bottom of this beam sufficiently to secure it by means of a nut J, or in any other suitable manner. Attention is called to the fact that the bottom beams 7 located at the opposite ends of the framework 5, are interposed between the side beams 6, and are connected therewith by rods 22, which pass transversely through the beams 6 and longitudinally through the beams 7. In order to strengthen the structure, plates L are interposed between the inner surfaces of the beams 6 and the opposite extremities of the beams 7. These plates are also provided with openings through which the rods K pass. In order to increase the strength afforded by the plates L, their upper and lower extremities are bent at right angles to the body of the plate, as shown at M and N. This rocker construction is substantially similar to the construction shown in my previous application, Serial No. 413,522, filed January 31, 1908, except that in my previous construction flat metal straps were employed, while in my present construction cables are used.

For the purpose of operating the dumping body or tilting it in the one direction or the other, as may be desired, I employ a transversely located shaft 10 whose opposite extremities are provided with cone-shaped drums 12. Centrally located upon the shaft 10 and made fast thereto, is a worm wheel 13 which is engaged by a worm 14 mounted upon a shaft 15 journaled in the framework 5 and provided at its outer extremity with a hand crank 16.

There are two operating cables 17. These cables are respectively connected with the opposite sides of the dumping body, as shown at 18, their opposite extremities being respectively connected with the drums 12. Intermediate these drums each cable engages a guide pulley 19, these guide pulleys being mounted upon a transversely disposed beam A centrally located upon the framework 5. The extremities of the beam A project beyond the side beam 6 on both sides of the framework of the bed, and are provided with extension brackets B in which are mounted pulleys 20, which are engaged by the cables 17. The object of the beam A, and the extension brackets, is to bring the pulleys 20 into such a position with reference to the points where the cables are attached to the dumping body, that the downward pull of the cables on the dumping body shall, as far as possible, be in a vertical direction during the dumping operation, in order to utilize the power applied for dumping purposes to the best advantage. The pulleys 20 are engaged by the cable 17 between the pulleys 19 and the points 18 where the cables are attached to the dumping bed. When the dumping body is in the horizontal position, its opposite sides are engaged by short bars 21 which are pivotally connected with the rods 22, heretofore described. These supporting bars are also pivotally connected with longitudinally disposed rods 23, the rear extremity of each of which is connected, by means of link R, with a lever 24 fulcrumed at 25. When it is desired to dump the vehicle body in either direction, the lever which controls the bars 21 on the dumping side, is shifted to disengage the bars 21 from the vehicle body on that side (see Fig. 1).

The opposite sides 26 of the dumping body are hinged as shown at 27. Each of these sides is locked in the raised or closed position by chains 28, which engage the slotted extremities 29 of metal bars 30, which are attached to the outer surface of the sides 26. These chains are of sufficient length to support the sides 26 in any desired position, from the closed position illustrated in Fig. 4, to the dumping position shown in Fig. 7. The slot in the extremity of each bar 30 is adapted to receive any link of the chain which fits therein, the adjacent link forming a stop to prevent the chain from slipping through the slot. When the side 26 is in the position shown in Fig. 7 it forms a chute or guide for the contents of the dumping body as they are discharged.

The drum should be inclosed by a housing 33, which is preferably composed of two members respectively provided with rearwardly located flanges 34, which are secured to one of the bottom beams 7 of the framework by bolts 35. These housing members are provided with apertured ears 36 connected by bolts 37.

In order that the ends 38 and 39 of the dumping body may be sufficiently supported and reinforced when there is no load, inner vertically disposed cleats 40 are applied to the sides 26 of the body, and when the latter are in the closed or raised position, they engage the said ends of the body upon their inner surfaces.

From the foregoing description, the use and operation of my improved dumping mechanism will be readily understood. Assuming that the dumping body occupies the horizontal position, and that it is desired to dump its contents, the supporting bars 21 are released on the dumping side by moving one of the levers 24 to the inclined position as shown in Fig. 1. The locking chain 28 is then released from the plate 30 on the dumping side. The hand crank 16 is then turned in the proper direction, whereby one of the cables 17 is unwound from its cone-shaped drum, while the other cable is wound thereon. By virtue of the peculiar shape of the drums, and the arrangement of the cables thereon, the cable on the dumping side of the vehicle is wound more rapidly at the beginning of the operation and gradually diminishes toward the close of the operation; while the cable upon the opposite side begins unwinding at a smaller diameter and unwinds toward the greatest diameter of the drum, and thus gradually increases in speed as the body approaches the dumping position.

It will be understood that during the tilting operation, the arc of travel of the side of the vehicle body on the dumping side is continually diminishing, while the corresponding arc on the opposite side is continually increasing. Hence, in order that both cables may remain taut, it is important that the drums be shaped to harmonize with the aforesaid conditions.

The cone-shaped drums 12 are spirally grooved, whereby the cable is prevented from slipping laterally thereon, or from a high to a low point. This feature also makes it practicable to regulate the travel of the cables upon the drums, by varying the pitch of the spiral.

By referring to Fig. 7 of the drawing it will be observed that the centrally located bottom beam 7, upon which the correspondingly located rocker 8 of the dumping body rests, is not connected with the dumping body by means of cables 9 which engage the rockers 8, as is the case with the end bottom beams 7.

Having thus described my invention, what I claim is:

1. In dumping mechanism for vehicles, the combination with a relatively stationary frame, of a dumping body mounted to rock thereon, cables connected with the body on opposite sides, and cone-shaped operating drums with which the opposite extremities of the cables are connected, the said drums being constructed to cause the cable on the dumping side to diminish its speed of travel as the tilting of the dumping body increases, while the cable on the opposite side simultaneously increases its speed of travel, substantially as described.

2. The combination with a suitable stationary frame, of a dumping body mounted to rock thereon, whereby the body may be tilted to the dumping position in either direction, flexible devices connected with the opposite sides of the vehicle body, and cone-shaped winding drums with which the flexible devices are also connected, the said drums being constructed to diminish the speed of travel of the flexible device on the dumping side and increase the speed of travel of the flexible device on the opposite side, during the operation of tilting the vehicle body in either direction, substantially as described.

3. The combination with a suitable stationary framework, of a body mounted to rock transversely thereon, for the purpose of tilting the body to the dumping position in either direction, cables connected with the opposite sides of the vehicle body, an operating shaft provided with drums, the cables being respectively connected with the said drums, the latter being cone-shaped, and the cables being so connected that the one on the dumping side diminishes its speed of travel during the tilting operation of the vehicle body, while the cable on the opposite side simultaneously increases its speed of travel, substantially as described.

4. The combination with a relatively stationary frame, of a dumping body mounted to rock transversely thereon, whereby the body may assume the dumping position in either direction, cables respectively connected at one extremity with the opposite sides of the vehicle body, and cone shaped winding drums with which the opposite extremities of the cables are connected, the said drums being constructed to actuate the cables to tilt the body to the dumping position in either direction, both cables being kept taut during the dumping operation, substantially as described.

5. In mechanism of the class described, the combination with a relatively stationary frame work, of a body mounted to rock thereon, whereby it may be transversely tilted to the dumping position in either direction, an operating shaft, cone-shaped drums mounted on the shaft, cables connected with the opposite extremities of the dumping body, the cables being also connected with the said drums in such a manner that as the shaft is rotated to tilt the dumping body, the cable on the dumping side will diminish in speed as the operation proceeds, while the cable on the opposite side will simultaneously increase in speed, for the purpose set forth.

6. In mechanism of the class described, the combination with a relatively stationary frame work, of a dumping body whose bottom is provided with rockers, the frame work having transversely arranged supports for the rockers, flexible devices connecting the rockers with the frame work, an operating shaft provided with cone-shaped drums, and cables connected with the said drums at one extremity and with the opposite sides of the dumping body at their opposite extremities, the cables being so connected with the drums that the speed of travel of the one on the dumping side gradually diminishes during the operation of tilting the body, while the cable on the opposite side gradually increases in speed, during the same operation, substantially as described.

7. The combination with a suitable stationary framework, of a dumping body mounted to rock transversely thereon, cables connected with the opposite sides of the dumping body, an operating shaft provided with spirally grooved cone-shaped drums, the cables being respectively connected with the said drums in such a manner that the cable on the dumping side diminishes its speed of travel during the tilting operation of the vehicle body, while the cable on the opposite side simultaneously increases its speed of travel.

8. The combination with a suitable stationary framework, of a body mounted to rock transversely thereon for the purpose of tilting the body to the dumping position in either direction, cables connected with the opposite sides of the vehicle body, an operating shaft provided with spirally grooved cone-shaped drums, the cables being respectively connected with the said drum in such a manner that the cable on the dumping side diminishes its speed of travel during the tilting operation of the vehicle body, while the cable on the opposite side simultaneously increases its speed of travel, a transverse beam applied to the stationary part of the vehicle and projecting laterally beyond the same on both sides, the outer extremities of the said beam being provided with guide pulleys which are engaged by the cables intermediate the dumping body and the drums, the said transverse beam being also provided with other guide pulleys engaged by the cables, substantially as described.

9. The combination with a suitable stationary framework, of a body mounted to rock transversely thereon for the purpose of tilting the body to the dumping position in either direction, cables connected to the opposite sides of the vehicle body, spirally grooved cone-shaped winding drums mounted on the stationary part of the vehicle, the cables being respectively connected with the said drums in such a manner that the cable on the dumping side diminishes its speed of travel during the tilting operation of the vehicle body, while the cable on the opposite side simultaneously increases its speed of travel, and guide pulleys suitably supported upon the stationary part of the vehicle and engaged by the cables intermediate the drums and the dumping body, the said guide pulleys being so located that the cables, when the dumping body is in the horizontal position, occupy approximately a vertical position between the dumping body and the guide pulleys, whereby the power employed for dumping purposes is utilized to the best advantage, substantially as described.

In testimony whereof I affix my signature in presence of two witnesses.

DOX W. CARR.

Witnesses:
A. J. O'BRIEN,
A. EBERT O'BRIEN.